April 8, 1947.  C. CHRISTIANSEN  2,418,575
BEET HARVESTER
Filed July 6, 1944  4 Sheets-Sheet 1

Inventor
C. Christiansen,
By William T. Deier
Attorney

April 8, 1947.　　　C. CHRISTIANSEN　　　2,418,575
BEET HARVESTER
Filed July 6, 1944　　　4 Sheets-Sheet 2
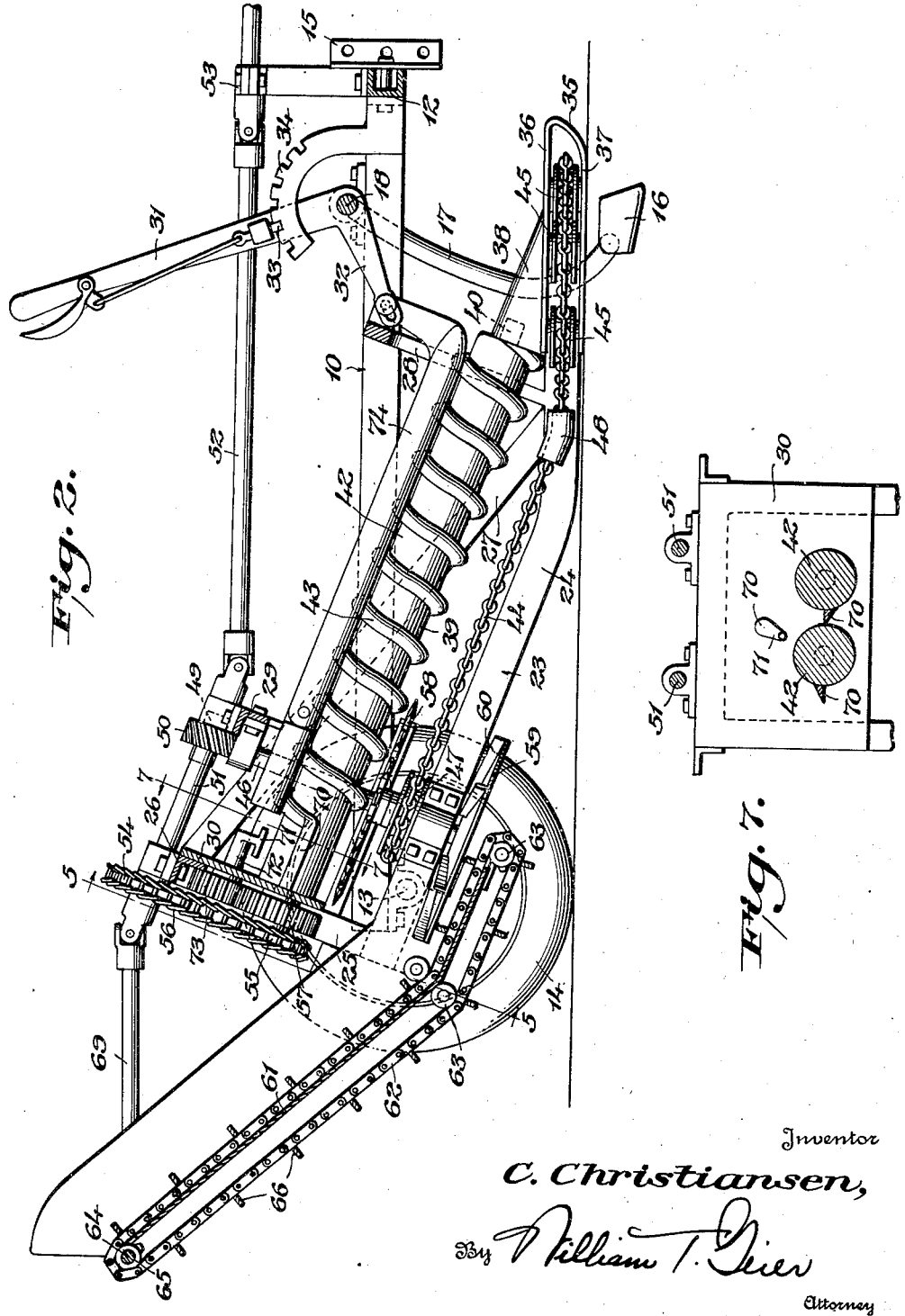
Inventor
C. Christiansen,
By William T. Gier
Attorney April 8, 1947.  C. CHRISTIANSEN  2,418,575
BEET HARVESTER
Filed July 6, 1944    4 Sheets-Sheet 3
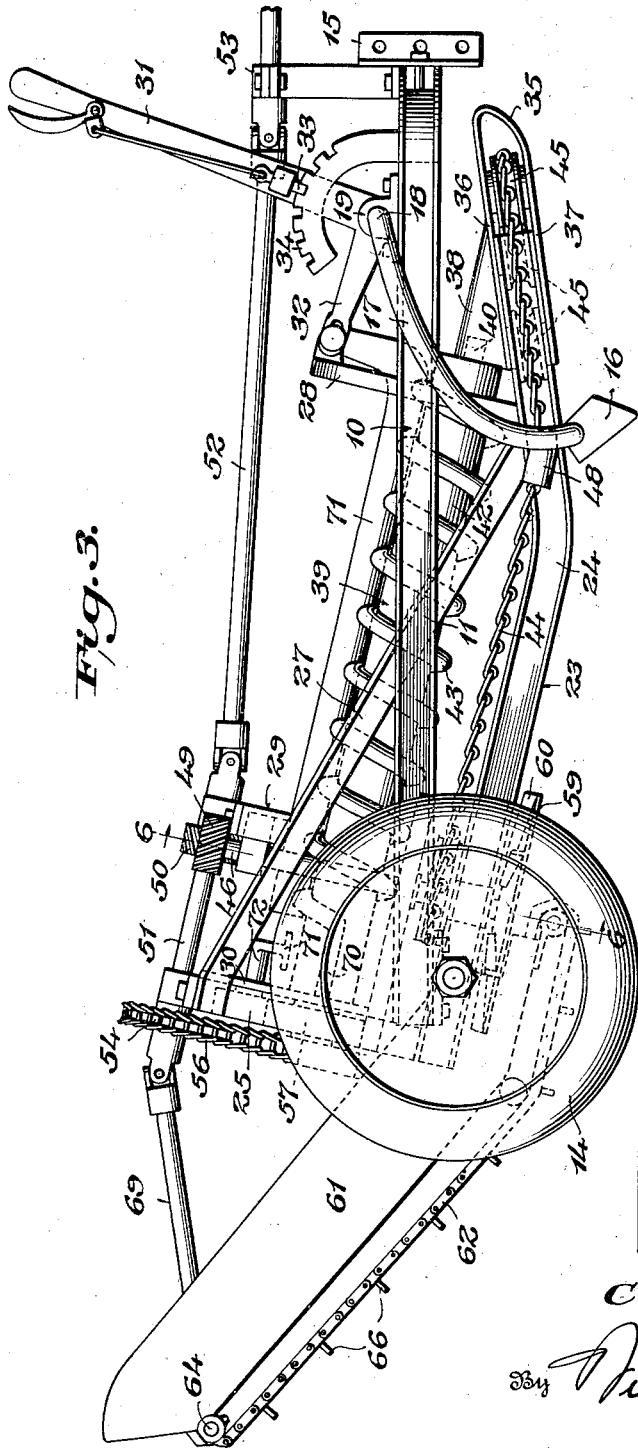
Inventor
C. Christiansen,
By William T. Geier
Attorney April 8, 1947.    C. CHRISTIANSEN    2,418,575
BEET HARVESTER
Filed July 6, 1944                4 Sheets-Sheet 4
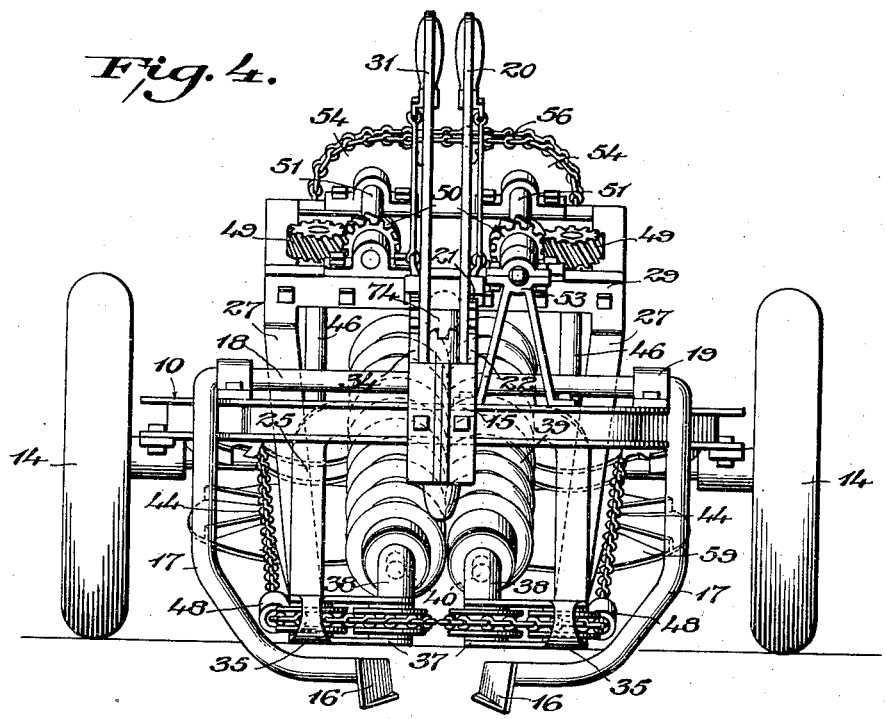
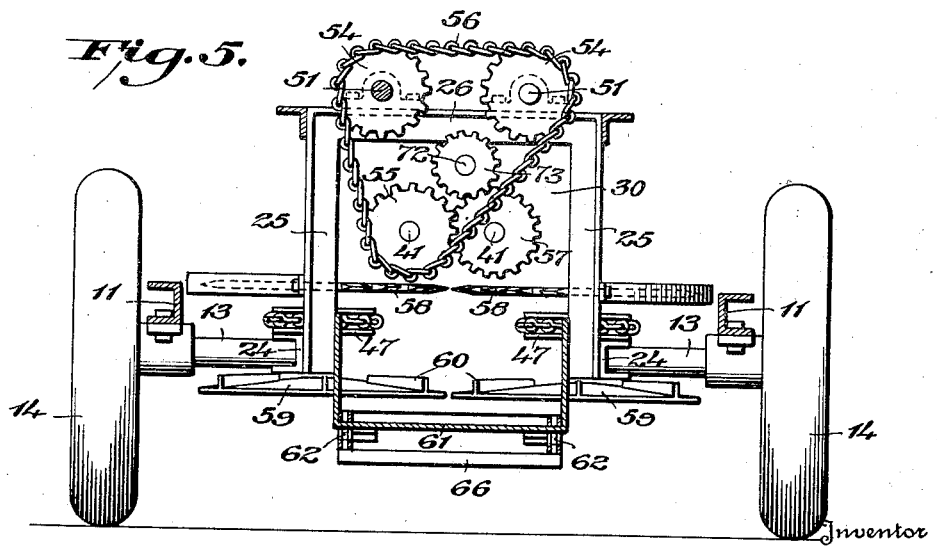
Inventor
C. Christiansen,
By William T. Geier
Attorney Patented Apr. 8, 1947

2,418,575

UNITED STATES PATENT OFFICE 2,418,575

BEET HARVESTER

Christian Christiansen, St. Cloud, Minn.

Application July 6, 1944, Serial No. 543,687

17 Claims. (Cl. 55—108)

This invention relates to a machine for harvesting roots such as sugar beets, turnips and the like, and has particular reference to an improved machine for this purpose which is of the general type comprising plow means for loosening the roots, a pair of rotatable, upwardly and rearwardly inclined screw-members to grip the tops therebetween and to pull and elevate the roots, and knife means to cut the tops from the elevated roots.

One special and important object of the invention is to provide a machine of the type mentioned with simple, practical means to gather and bunch the root tops as the machine advances and to direct the bunched tops between the screw members, thus to render the machine of materially higher efficiency than similar prior machines which are devoid of root top gathering and bunching means.

Another special and important object of the invention is to provide a machine of the type mentioned with simple, practical means to engage the root tops which project above the screw members and to divide them and bend them downwardly against and to hold them engaged with the screw members, whereby the screw members are rendered substantially positive in operation to pull and elevate substantially all of the roots.

Another special and important object of the invention is to provide a machine of the type mentioned with simple, practical knife means, separate from the top severing knife means, to cut and recover from the severed root tops any severed root portions which may remain thereon.

The present machine preferably includes conveyor means to receive and elevate the several roots and to deliver them to a farm wagon or the like, and in this connection another special and important object of the invention is to provide means in the form of a pair of rotatable, cooperating disk elements to intercept the severed roots and to direct them onto the conveyor means.

Another special and important object of the invention is to provide a machine of the type mentioned which embodies the improved features referred to and which at the same time, is of simple, practical construction and of low production, operation and maintenance costs.

With the foregoing and other objects in view, which will become more fully apparent as the nature of the invention is better understood, the same consists in a root harvesting machine of the general type mentioned embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 2 is a central, longitudinal section through the machine showing a root gathering disposition of the parts thereof.

Figure 3 is a side elevation of the machine showing the root gathering parts thereof elevated.

Figure 4 is a front end view of the machine.

Figure 5 is a cross section on the line 5—5 of Figure 2.

Figure 6 is a cross section on the line 6—6 of Figure 3, and

Figure 7 is a cross sectional view on line 7—7 of Figure 2.

Figure 1:
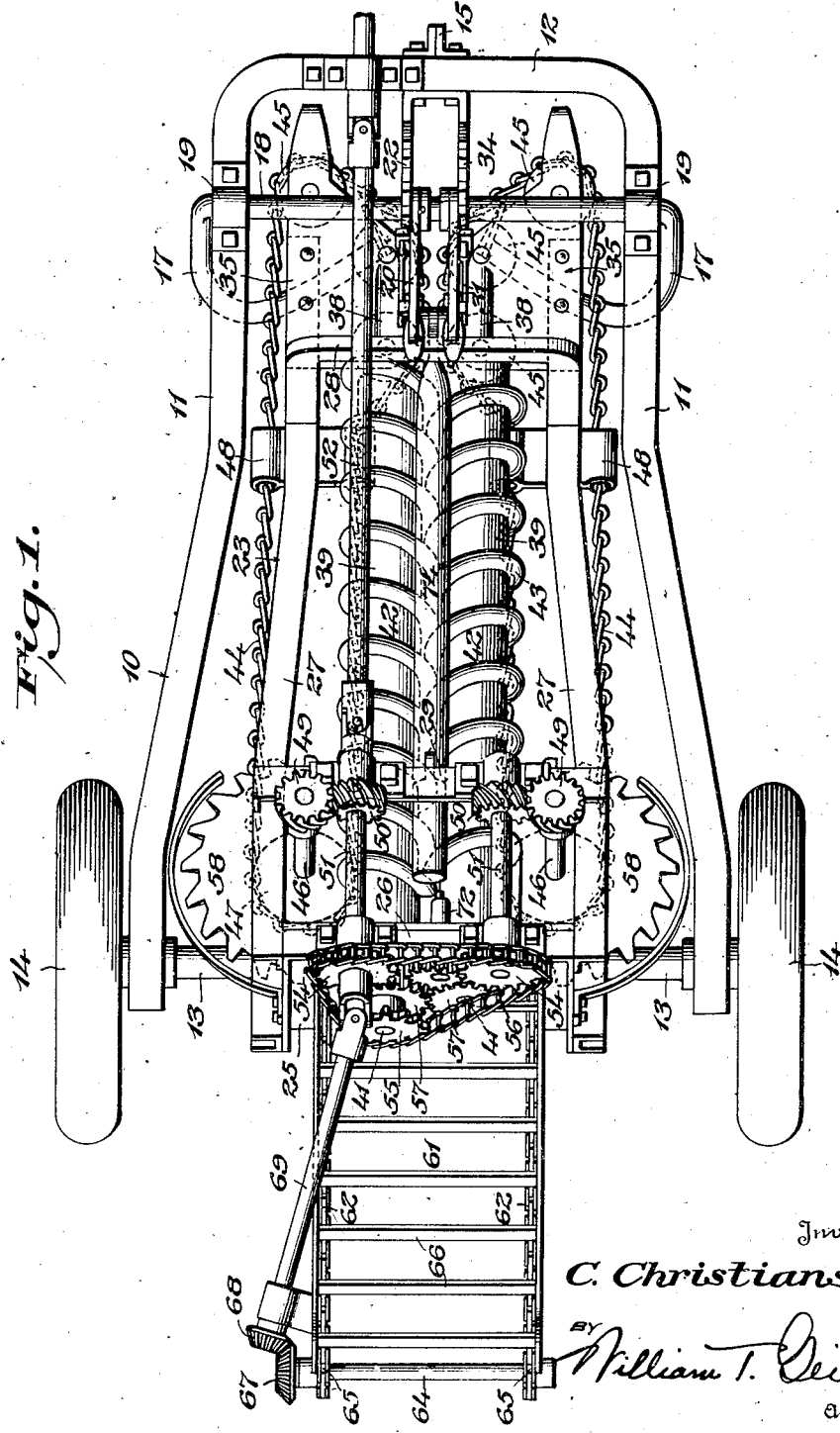
Figure 1 is a top plan view of a root harvesting machine constructed in accordance with one practical embodiment of the invention.

Referring to the drawings in detail, 10 designates the main frame of the machine which may be formed from any suitable material and which, as viewed in plan, is of substantially U-shape as shown, the same comprising a pair of spaced apart side rails 11, 11 connected together at their front ends by a cross rail 12. At or near its rear end, this main frame 10 is supported upon the axles 13, 13 of a pair of wheels 14, 14, while at its front end it is provided with suitable means such as the vertically disposed, apertured angle-iron members indicated at 15, whereby it may readily be attached to and supported at a desired elevation by a tractor or other power unit to be employed for pulling the machine and driving the operating parts thereof.

Near its front end the main frame 10 carries a pair of plow elements 16, 16, which are vertically adjustable for plowing at different depths and which are laterally spaced apart to pass at opposite sides of the roots to be harvested. They are, moreover, disposed in forwardly and upwardly diverging relationship to each other so as initially to elevate and loosen the roots. Said plow elements are carried by the lower, inwardly directed end portions of a pair of arms 17, 17, which, at their upper ends, are connected together by a shaft 18 which extends transversely across the frame 10 and is mounted for rotation in bearings 19 carried by the side rails 11, 11. Thus, by rotating said shaft 18, the arms 17, 17, may be swung to adjust said plow elements for plowing at different depths and to elevate them entirely above the ground to permit the machine freely to be transported from place to place. For rotating the shaft 18, the same may have fixed thereto a lever 20, while for holding said shaft in any desired rotated position, said lever may carry a latch 21 for cooperation with a toothed segment 22 suitably fixed to the main frame 10, as, for example, to the cross rail 12 thereof.

Within the main frame 10 is an inner frame 23 which comprises a pair of spaced apart side rails 24, 24, a pair of uprights 25, 25, rising from the rear end portions of said side rails 24, 24, respectively, a cross member 26 connecting said uprights 25, 25, together at their upper ends, a pair of forwardly and downwardly inclined bracing members 27, 27, extending between the upper ends of the uprights 25, 25 and forward end portions of the side rails 24, 24, an arched member 28 connecting said side rails 24, 24 together near their forward ends, and a second arched member 29 connecting the bracing members 27, 27, together near their upper ends. In addition, said inner frame 23 includes a substantially vertically disposed, transversely extending plate 30 riveted, welded or otherwise suitably fastened to the uprights 25, 25.

At or near its rear end, the inner frame 23 is pivotally mounted upon the wheel axles 13, 13, whereby it may be swung between raised and lowered positions, while mounted on the shaft 18 for free rotation relative thereto is a lever 31 having an arm 32 connected with the arched member 28 so that by swinging said lever said inner frame may be swung between raised and lowered positions. For holding said inner frame in any desired position of pivotal adjustment, the lever 31 may carry a latch 33 for cooperation with a toothed segment 34 fixed to the inner frame 10, as, for example, to the cross rail 12 thereof.

The rear end portions of the side rails 24 of the inner frame 23 are inclined downwardly and forwardly, while the front end portions of said side rails are angularly related to their said rear end portions so as to be disposed substantially horizontally when said inner frame is in its lowered position.

At their front ends the inner frame side rails 24, 24, have secured thereto housings 35, 35, respectively, each of which comprises an upper, horizontally disposed plate 36 and a lower, horizontally disposed plate 37, while upon the top of each upper plate 36 is suitably fastened a bearing member 38.

A pair of upwardly and rearwardly inclined screw members 39, 39, are disposed in side to side relationship to each other and at their front ends are provided with trunnions 40 which are journaled in the bearing members 38 and at their rear ends are provided with stub shafts 41 which are journaled in suitable bearings carried by the plate 30. Thus, said screw members are mounted in the inner frame to be raised and lowered therewith and, at the same time, are journaled for rotation.

The screw members 39 may be of any suitable construction, but preferably each comprises a roller 42 around which extends a helix 43 of preferably circular cross section. The rollers 42 may be either solid or hollow and either cylindrical or conical, but in any event the helices 43 extend reversely relative to each other and in directions such that they cooperate to feed upwardly root tops disposed between the rollers when the latter are rotated in opposite directions with their inner side portions moving upwardly and their outer side portions moving downwardly. Moreover, said helices are disposed relative to each other so that the inner portions of the turns of each lie between the inner portions of the turns of the other so as most effectively to grip and elevate root tops disposed between the rollers.

The screw members 39 are disposed at opposite sides of the central, vertical, longitudinal plane of the machine and a pair of endless chains 44, 44, are provided for gathering and bunching the tops of roots loosened by the plow elements 16 and for directing the said bunched tops between the lower or lead ends of said screw members as the machine is advanced.

The chains 44, 44 are disposed at opposite sides of the central, vertical, longitudinal plane of the machine and each chain extends over a related series of three horizontally disposed rollers 45 mounted between the plates 36, 37 of a related one of the housings 35. Two of the rollers of each series are mounted in spaced relationship to each other longitudinally of the machine adjacent to the central, vertical longitudinal plane of the machine, one in advance of and the other below the front or lead end of the related screw member 39.

The other or third roller of each series is mounted in advance of and outwardly with respect to the forwardmost of the two first-mentioned rollers of the series. Consequently, the forward portions of the two chains 44, 44 cooperate to define a forwardly flaring mouth and a narrow throat with the mouth disposed in advance of the throat to gather the root tops and direct them into the throat where they are bunched, and the throat disposed to direct them between the forward or lead ends of the screw members 39, 39 to be picked up and elevated by the latter.

Disposed outwardly of the screw members 39, 39 and located a suitable distance forwardly of their rear ends, are two substantially vertically disposed shafts 46, 46 which are journaled for rotation in upper and lower bearings carried, for example, by the arched member 29, and the side rails 24 of the inner frame 23 and which have fixed thereto sprocket wheels 47, 47, respectively, over which the endless chains 44, 44 extend, respectively. Accordingly, by rotating said two shafts in opposite directions such that the inner reaches of the two chains are caused to travel rearwardly, the forward or mouth and throat forming portions of said chains are caused to operate to gather and bunch the root tops and to direct them between the lead ends of the screw members 39, 39, as aforesaid.

The front portions of the chains 44, 44, are disposed substantially horizontally in the planes of the front portions of the inner frame side rails 24, 24, respectively. On the other hand, the rear portions of said chains are inclined upwardly and rearwardly and are disposed substantially parallel to the rear portions of said side rails 24, 24. Where their said front and rear portions meet, said chains pass through guide elements 48 carried by the side rails 24, 24, whereby their said front and rear portions are maintained angularly related to each other for proper cooperation with the rollers 45 and the sprocket wheels 47.

Fixed to the upper ends of the shaft 46, 46 are helical gears 49, 49 respectively, with which mesh companion helical gears 50, 50, respectively, which are fixed on substantially horizontally disposed shafts 51, 51, respectively, mounted in suitable bearings carried by the cross member 26 and the arched member 29, respectively. The gears 49, 49, are disposed at the inner side of the gears 50, 50, respectively, so that by rotation of the latter gears in like directions the shafts 46, 46 are driven in opposite directions.

Connected to the front end of one of the shafts 51 is a drive shaft 52 which extends forwardly above the frames 10 and 23 and is journaled in a suitable bearing 53 carried by the main frame 10 at the front thereof. The front end portion of this drive shaft extends forwardly of said main frame for connection with the usual power take-off shaft of a tractor hitched to said main frame. Accordingly, said power shaft may be driven at will by the tractor.

Sprocket wheels 54, 54, are fixed to the rear ends of the shafts 51, 51, respectively while another sprocket wheel 55 is fixed to the stub shaft 41 of one of the screw members 39 and over these sprocket wheels extends an endless sprocket chain 56. Moreover, the two stub shafts 41, 41 have fixed thereon intermeshing pinion gears 57, 57, respectively. Manifestly, therefore, when the drive shaft 52 is driven, it operates to drive the shafts 46, 46, and, consequently, the root top gathering and bunching chains in opposite directions, and at the same time, to drive the root top gripping and root pulling screw members 39, 39 in opposite directions. In this connection, the arrangement of the helical gears 49, 50, is such, as shown, that rotation of the drive shaft 52 in a direction to cause the chains 44, 44 to gather, bunch and direct the root tops between the screw members 39, 39, rotates said screw members in directions to pull and elevate the roots.

Fixed to the shaft 46, 46 for rotation therewith and disposed directly beneath the screw members 39, 39, near their upper or rear ends, are disk-type knives 58, 58, respectively, which cooperate to sever the roots from the root tops as the roots approach the rear or upper ends of said screw members.

Beneath the knives 58, 58 the shafts 46, 46, have fixed thereon for rotation therewith disks 59, 59, respectively, upon which the severed roots fall. These disks 59, 59 have radial ribs 60 on their upper faces, or otherwise are suitably formed, so that they serve, as they rotate in opposite directions, to throw the severed roots rearwardly onto the front end portion of a trough 61 which extends upwardly and rearwardly to a suitable elevation and rearwardly to a suitable distance from the rear end of the machine for delivery of the roots from its rear or upper end into a farm wagon or the like which may be driven or drawn behind the machine. Alternatively, the trough 61 may extend laterally with respect to the machine for delivery of the severed roots at the side of the machine. In any event, conveyor means preferably is associated with the trough 61 for causing the severed roots to be moved upwardly through the same.

The said conveyor means may be of any suitable type and is illustrated in the drawings by way of example as comprising a pair of endless chains 62 disposed at the sides of the trough 61 and guided by rollers 63 to have their upper reaches travel at the bottom of said trough. At the upper end of said trough is a transverse shaft 64 having thereon sprocket wheels 65 over which the chains 62 extend so that by rotation of said shaft the chains are driven. The chains are connected by cross members 66 which extend across the bottom of the trough so that they act to move the roots upwardly when the shaft 64 is rotated in a direction to cause the upper reaches of the chains to travel upwardly. On one end of the shaft 64 is a bevel gear 67 with which meshes a bevel gear 68 on a power take-off shaft 69 connected to the rear end of one of the shafts 51, whereby the conveyor is driven in harmony with the screw members 39 and the chains 44.

The helices 43 terminate forwardly of the rear ends of the rollers 42 and each roller is provided, between its rear end and the rear end of its helix 43, with a longitudinally extending knife 70 for cooperation with the other roller to cut from the severed root tops any root portion which may have been severed by the knives 58 and which may remain on the root tops. Any small pieces of root severed from the root tops by the knives 70 fall between the rollers 42, 42 onto the trough 61 and are conveyed to and discharged from the upper end of said trough by the conveyor. On the other hand, the severed root tops are swept laterally outward from the tops of the screw members 39 by an arm 71 on a shaft 72 which is journaled in a bearing carried by the plate 30 and which carries a pinion 73 in mesh with one of the pinion gears 57 whereby it is rotatably driven.

Means in the form of a bar 74 is provided for dividing the root tops which project above the screw members 39 and for folding them downwardly against and holding them engaged with the tops of said screw members whereby the gripping action of the latter upon the tops is enhanced and the efficiency of the machine is correspondingly increased. The bar 74 is simply a gravity bar which rests in the crotch between the screw members 39, 39 at the tops thereof and by its weight performs the function stated. It is free to rise and fall to cooperate with root tops of varying thicknesses and may be held operatively positioned relative to the screw members 39 in any suitable manner as, for example, by being pivoted at its front end to the arched member 28. Preferably said bar is composed of a plurality of articulated sections so as best to perform its functions.

In operation, the machine is drawn forwardly by a tractor to which it is hitched, and as it is drawn forwardly the tractor is employed to drive the shaft 52 and thereby drive the operating parts of the machine in the manner and for the purposes heretofore stated. The depth at which the plows 16 operate obviously may be regulated at will and, moreover, the level of the front end portion of the inner frame 23 likewise may be regulated at will to dispose the front end portions of the chains 44 at most advantageous elevations. Furthermore, it will be noted that the levers 20 and 21 are advantageously located at the front of the machine where they are accessible for manipulation by the driver of the tractor employed for pulling and supplying power to the machine.

From the foregoing description considered in connection with the accompanying drawings it is believed that the construction and operation of the present machine will be clearly understood and its advantages appreciated. It is desired to point out, however, that while only a single specific structural embodiment of the invention has been illustrated and described, the same is readily capable of many structural variations and refinements within its spirit and scope as defined in the appended claims.

I claim:

1. In a root harvesting machine of the type comprising a pair of upwardly and rearwardly inclined rotatable screw members disposed in side to side relationship to grip the root tops therebetween and to elevate the tops with the roots attached thereto, knife means mounted in the path of the beets while they are elevated by said screws for cutting the roots from the tops, and a bar disposed in the crotch between the screw members at the tops thereof to fold the root tops downwardly against and to maintain them engaged with the tops of said screw members to enhance the grip of the latter upon the tops.

2. In a root harvesting machine of the type comprising a pair of upwardly and rearwardly inclined rotatable screw members disposed in side to side relationship to grip the root tops therebetween and to elevate the tops with the roots attached thereto, knife means mounted in the path of the beets while they are elevated by said screws for cutting the roots from the tops, and an elongated bar disposed in the crotch between the screw members at the tops thereof and extending contiguously to said screw members throughout major portions of the lengths thereof to fold the root tops downwardly against and to maintain them engaged with the tops of said screw members to enhance the grip of the latter upon the tops, said bar being freely movable vertically and acting by its weight to maintain the root tops engaged with the tops of the screw members.

3. A root harvesting machine as set forth in claim 2 in which the bar is connected to a part of the machine to be retained in its operative position relative to the screw members.

4. A root harvesting machine as set forth in claim 2 in which the bar is composed of a plurality of articulated sections.

5. In a root harvesting machine of the type comprising a pair of upwardly and rearwardly inclined rotatable screw members disposed in side by side relationship, to grip the root tops therebetween and to elevate the tops with the roots attached thereto, knife means mounted in the path of the beets while they are elevated by said screws for cutting the roots from the tops, and other knife means carried by at least one of the screw members for cooperation with the other screw member to cut from the severed root tops any portions of the roots which may not have been severed from the tops by the first-mentioned knife means.

6. In a root harvesting machine of the type comprising a pair of upwardly and rearwardly inclined rotatable screw members disposed in side by side relationship, to grip the root tops therebetween and to elevate the tops of the roots attached thereto, knife means mounted in the path of the beets while they are elevated by said screws for cutting the roots from the tops, and a knife element carried by each of the screw members for cooperation with the other screw member to cut from the root tops severed by said knife means any portions of the roots which may not have been severed from the tops by said knife means.

7. In a root harvesting machine of the type comprising a pair of upwardly and rearwardly inclined rotatable screw members disposed in side to side relationship to grip the root tops therebetween and to elevate the tops with the roots attached thereto, knife means mounted in the path of the beets while they are elevated by said screws for cutting the roots from the tops, and means comprising a pair of endless chains having substantially horizontally disposed portions defining a forwardly flaring root top gathering mouth and a narrow root top bunching throat at the rear of said mouth for directing the root tops between the forward ends of said screw members.

8. In a root harvesting machine of the type comprising a pair of upwardly and rearwardly inclined rotatable screw members disposed in side to side relationship to grip the root tops therebetween and to elevate the tops with the roots attached thereto, knife means mounted in the path of the beets while they are elevated by said screws for cutting the roots from the tops, means for conveying the roots to a discharge point, and a pair of cooperating rotatable disks beneath said knife means to intercept the roots and to move them to said conveying means.

9. In a root harvesting machine of the type comprising a pair of upwardly and rearwardly inclined rotatable screw members disposed in side to side relationship to grip the root tops therebetween and to elevate the tops with the roots attached thereto, a pair of rotatable substantially vertical shafts at the outer sides of said screw members near the rear ends thereof, a pair of disk-type knives on said shafts below said screw members for severing the elevated roots from the tops, conveyor means at the rear of the machine for conveying the roots to a point of discharge, and a pair of disks on and rotatable with said shafts and disposed beneath said knives to intercept the severed roots and to shift them upon said conveyor means.

10. In a root harvesting machine of the type comprising a pair of upwardly and rearwardly inclined rotatable screw members disposed in side to side relationship to grip the root tops therebetween and to elevate the tops with the roots attached thereto, a pair of rotatable substantially vertical shafts at the outer side of said screw members near the rear ends thereof, a pair of disk-type knives on said shafts below said screw members for severing the elevated roots from the tops, sprocket wheels on said shafts beneath said knives, guide rollers carried by the machine adjacent to the front ends of said screw members, and a pair of endless chains extending over said sprocket wheels and said guide rollers and cooperating to gather and bunch the root tops and to direct them between said screw members.

11. In a root harvesting machine of the type comprising a main frame wheel supported at its rear end and provided at its front end with means for attaching it to a tractor, an inner frame pivoted at its rear end upon the wheel axles, lever means for raising and lowering the front end of said inner frame relative to said main frame, plow means carried by the main frame and vertically adjustable relative thereto for plowing at different depths to loosen the roots, a pair of upwardly and rearwardly inclined rotatable screw members carried by the inner frame and disposed in side to side relationship to grip the root tops therebetween and to elevate the tops with the roots attached thereto, a pair of rotatable substantially vertically disposed shafts carried by the inner frame at the outer sides of said screw members near the rear ends thereof, means to utilize power derived from the tractor for rotating said shafts and said screw members, a pair of cooperating disk-type knives carried by said shafts for cooperating to sever the roots from the tops, a sprocket wheel on each shaft beneath said knives, and a pair of endless chains driven by said sprocket wheels, respectively, and extending forwardly therefrom to points adjacent to the front ends of said screw members for cooperation with each other to gather and bunch the root tops and to direct them between said screw members.

12. In a root harvesting machine of the type comprising a pair of upwardly and rearwardly inclined rotatable screw members disposed in side to side relationship, to grip the root tops therebetween and to elevate the tops with the roots attached thereto, knife means mounted in the path of the beets while they are elevated by said screws for cutting the roots from the tops, other knife means carried by at least one of the screw members for cooperation with the other screw member to cut from the severed root tops any portions of the roots which may not have been severed from the top by the first-mentioned knife means, and means to sweep the severed root tops from the tops of said screw members.

13. In a root harvesting machine of the type comprising a pair of upwardly and rearwardly inclined rotatable screw members disposed in side to side relationship, to grip the root tops therebetween and to elevate the tops with the roots attached thereto, knife means mounted in the path of the beets while they are elevated by said screws for cutting the roots from the tops, other knife means carried by at least one of the screw members for cooperation with the other screw members to cut from the severed root tops any portions of the roots which may not have been severed from the tops by the first-mentioned knife means, and an arm swingable across the upper rear end portions of said screw members for sweeping the severed root tops from the tops of said screw members.

14. In a root harvesting machine of the type set forth in claim 8, wherein there is means disposed in the crotch between the screw members at the tops thereof and extending contiguously to said screw members throughout major portions of the lengths thereof to fold the root tops downwardly against and to maintain them engaged with the tops of said screw members to enhance the grip of the latter upon the tops, said means being freely movable vertically and acting by its weight to maintain the root tops engaged with the tops of the screw members.

15. In a root harvesting machine of the type set forth in claim 6, wherein each of said knife elements extend parallel to the longitudinal axis of its supporting screw member.

16. In a root harvesting machine of the type comprising a pair of upwardly and rearwardly inclined rotatable screw members disposed in side by side relationship, to grip the root tops therebetween and to elevate the tops of the beets attached thereto, means disposed above and between the screw members and extending throughout substantially the major portion of the lengths thereof to fold the root tops downwardly against and to maintain them engaged with the tops of said screw members to enhance the grip of the latter upon the tops, knife means mounted in the path of the beets while they are elevated by said screws for cutting the roots from the tops, and other knife means carried by at least one of the screw members and extending substantially parallel to the longitudinal axis thereof for cooperation with the other screw member to cut from the severed root tops any portions of the roots which may not have been severed from the tops by the first-mentioned knife means.

17. In a root harvesting machine of the type set forth in claim 16, wherein there is means for conveying the several portions of the roots to a discharge point, and wherein there is a rotatable means disposed in substantially vertical alinement with and beneath both of said knife means for moving the said severed root portions to the conveying means.

CHRISTIAN CHRISTIANSEN.

REFERENCES CITED

The following references are of record in the file of this patent:

UNITED STATES PATENTS

| Number | Name | Date |
| --- | --- | --- |
| 1,256,642 | Barber | Feb. 19, 1918 |
| 1,298,708 | Hermann | Apr. 1, 1919 |
| 1,280,207 | Glaze | Oct. 1, 1918 |
| 1,306,673 | Daniels | June 10, 1919 |

FOREIGN PATENTS

| Number | Country | Date |
| --- | --- | --- |
| 426,318 | British | 1935 |